F. STEIN.

Improvement in Ratchet-Drills.

No. 131,832. Patented Oct. 1, 1872.

Witnesses:
A. W. Almqvist
C. Sedgwick

Inventor:
F. Stein
per Munn & Co.
Attorneys.

UNITED STATES PATENT OFFICE.

FRANCIS STEIN, OF NEW YORK, N. Y., ASSIGNOR TO HIMSELF AND FREDERICK BREIVOGEL, OF SAME PLACE.

IMPROVEMENT IN RATCHET-DRILLS.

Specification forming part of Letters Patent No. 131,832, dated October 1, 1872.

*To all whom it may concern:*

Figure 1:
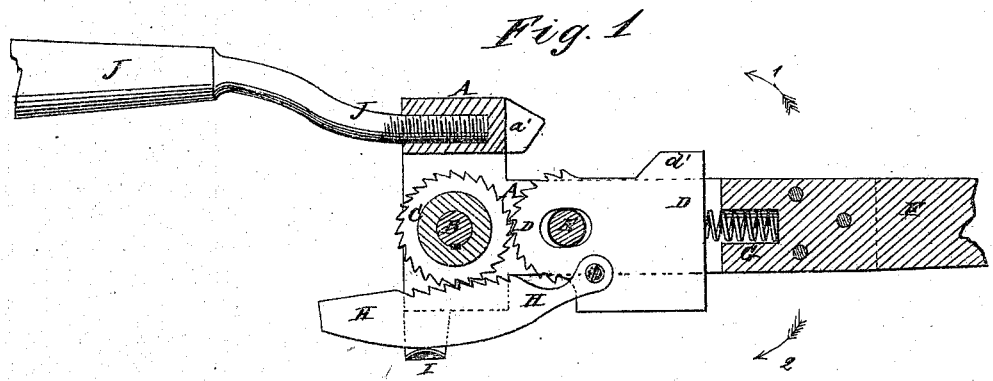
Figure 2:
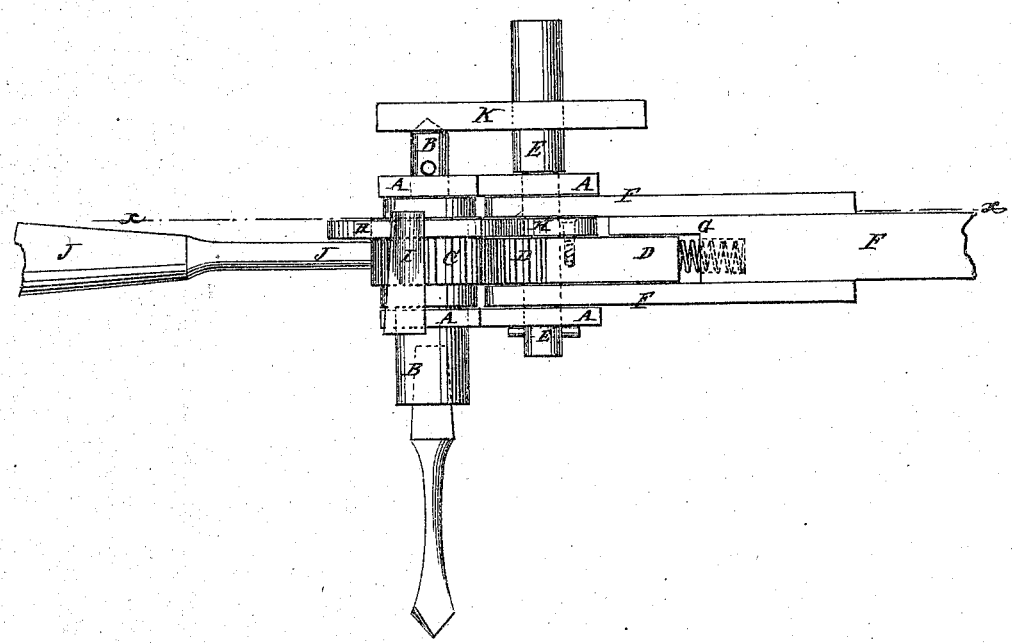

Be it known that I, FRANCIS STEIN, of the city, county, and State of New York, have invented a new and useful Improvement in Ratchet-Drill, of which the following is a specification:

In the accompanying drawing, Figure 1 is a detail sectional view of my improved ratchet-drill taken through the line $x\ x$, Fig. 2; and Fig. 2 is a side view of the same.

Similar letters of reference indicate corresponding parts.

My invention has for its object to furnish an improved ratchet-drill, which shall be so constructed as to drive the drill always in the same direction by the reciprocating movement of the handle; and it consists in the construction and combination of the various parts, as hereinafter more fully described.

A represents the frame with which the operating mechanism is connected. B is the drill-socket shaft, which works in holes in the frame A, and upon which within said frame is placed a ratchet-wheel, C. The ratchet-wheel C is keyed or otherwise secured to the shaft B, so as to carry the said shaft B with it in its revolution. D is a block placed within the frame A, and upon the forward end of which is formed a segmental ratchet-wheel, the teeth of which are similar to the teeth of the ratchet-wheel C, into which they mesh. The ratchet-wheel or pawl D is pivoted to the frame A by a pin or shaft, E, which passes through a slot in the said block D, as shown in Fig. 1. The block D is also connected with the handle F in a slot in the forward end of which it is placed. The ratchet-block D is held forward against the ratchet-wheel C by a small coiled spring, G, placed in a socket in the handle F, and which presses against the end of the ratchet-pawl D, as shown in Figs. 1 and 2. To the side of the pawl D or in a slot or recess formed in said pawl, is pivoted a second pawl, H, upon the inner edge of which are formed ratchet-teeth which mesh into the teeth of the ratchet-wheel C. The pawl H is held forward against the teeth of the ratchet-wheel C by a spring, I, which is attached to the frame A.

The outer edge of the pawl H is curved so that the spring I may hold it against the ratchet-wheel C, as its position is changed by the sweep of the handle F. By this construction, as the handle F is moved in the direction of arrow 1, the teeth of the ratchet-block D take hold of the teeth of the ratchet-wheel C and turn it. As the handle F reaches the end of its sweep, a projection, $d'$, of the ratchet-block D strikes against a projection, $a'$, formed upon the frame A, and throws the teeth of the ratchet-block D out of the teeth of the ratchet-wheel C, allowing the handle F to easily begin its return movement. As the handle F moves in the direction of arrow 2, the teeth of the pawl H take hold of the teeth of the ratchet-wheel C, and turn it in the same direction as it was turned by the ratchet-pawl D. As the teeth of either pawl D H are working, the teeth of the other pawl are sliding over the teeth of the said ratchet-wheel C. To the frame A is attached a second handle, J, by which the said frame is held stationary, while the handle F is being operated. The socket-shaft B projects above the frame A, so that the end of a screw may rest upon it to feed the drill down to its work. When the circumstances are such that the feed-screw cannot be used, the plate K is placed upon the upper end of the socket-shaft B, which plate is kept in place by the upper end of the pin that pivots the ratchet-block D and the handle F to the frame A. The plate K thus serves for a lever to rest upon to hold the drill down to its work.

Having thus described my invention, I claim as new, and desire to secure by Letters Patent—

The combination of the frame A, ratchet-wheel C, ratchet-block D, pivoting-pin E, handle F, spring G, pivoted-pawl H, spring I, and handle J with each other, substantially in the manner herein shown and described, and for the purposes set forth.

FRANCIS STEIN.

Witnesses:
JAMES T. GRAHAM,
T. B. MOSHER.